United States Patent [19]
Henrich

[11] 3,768,094
[45] Oct. 23, 1973

[54] DIGITAL ENCODER AND POSITION REFERENCE

[76] Inventor: Charles T. Henrich, 7 High St., Huntington, N.Y. 11743

[22] Filed: Dec. 10, 1971

[21] Appl. No.: 206,690

[52] U.S. Cl. .................... 340/347 P, 235/61.11 D
[51] Int. Cl. ............................................. G08c 9/08
[58] Field of Search ............ 235/61.11 D, 61.12 M; 340/347 P, 174.1 F; 179/100.2 CH

[56] References Cited
UNITED STATES PATENTS

| | | | |
|---|---|---|---|
| 3,171,104 | 2/1965 | Norton et al. | 340/347 P |
| 3,165,731 | 1/1965 | Spaulding | 340/347 P |
| 3,619,570 | 11/1971 | Grosbard | 235/61.11 D |
| 3,626,160 | 12/1971 | Hagopian | 235/61.11 D |
| 2,765,459 | 10/1956 | Winter | 340/347 P |
| 3,683,413 | 8/1972 | Schlaepfer | 235/61.12 M |
| 3,200,207 | 8/1965 | Rainer et al. | 179/100.2 CH |
| 3,291,918 | 12/1966 | Kuhrt | 179/100.2 CH |
| 3,441,884 | 4/1969 | Eppe | 340/174.1 F |

Primary Examiner—Maynard R. Wilbur
Assistant Examiner—Joseph M. Thesz, Jr.
Attorney—A. Yates Dowell, Jr.

[57] ABSTRACT

A position indicating apparatus having fixed and movable parts with one of the parts having magnetic position reference information thereon and the other part containing a flux sensitive element for sensing the position reference information and indicating the position of the sensor relative to the reference. The reference may be linear, circular, or cylindrical to conform to the need for measuring linear and/or angular displacements.

12 Claims, 26 Drawing Figures

PATENTED OCT 23 1973

3,768,094

INVENTOR
CHARLES T. HENRICH

BY

ATTORNEYS

INVENTOR
CHARLES T. HENRICH

BY
ATTORNEYS

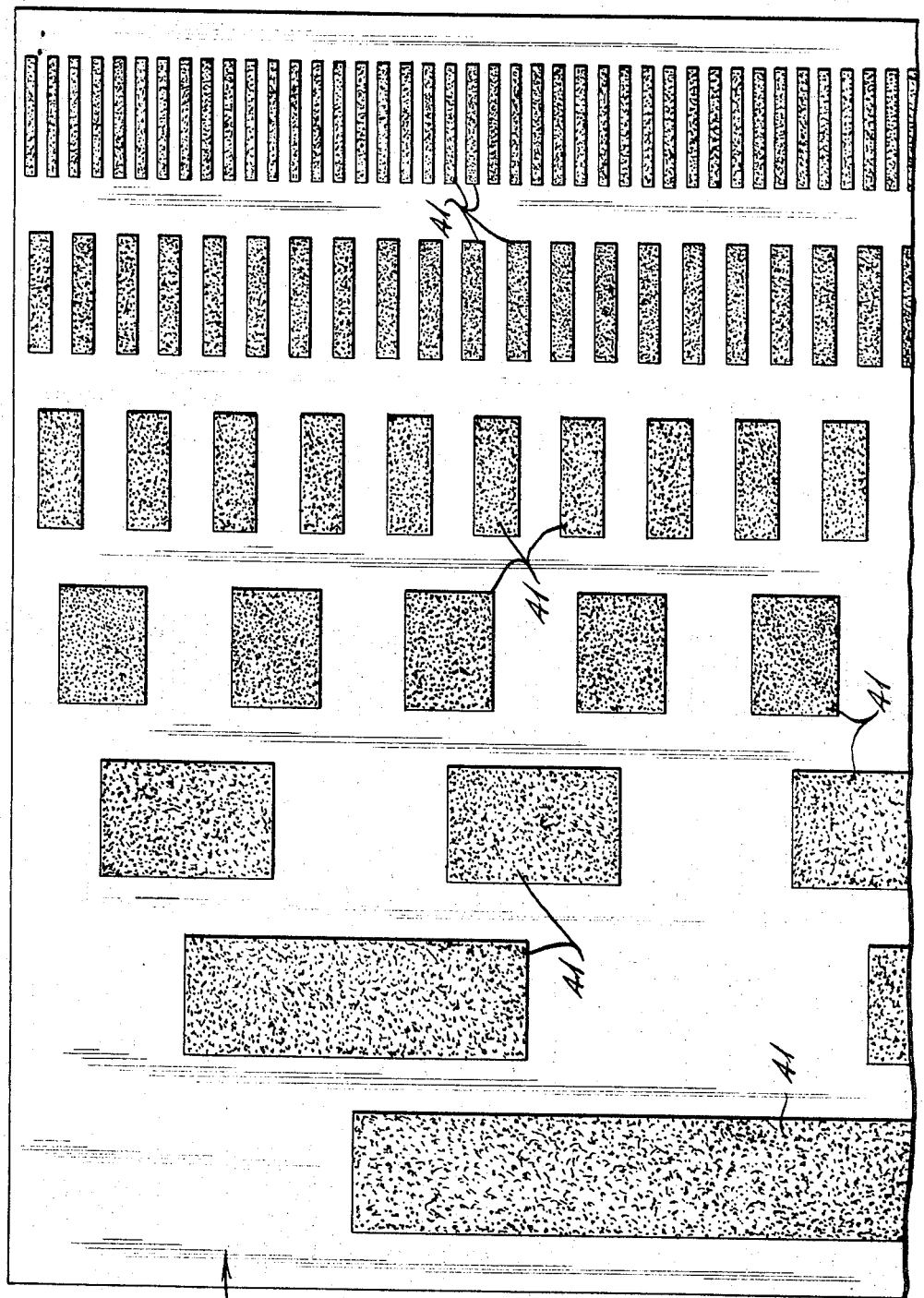
Fig. A

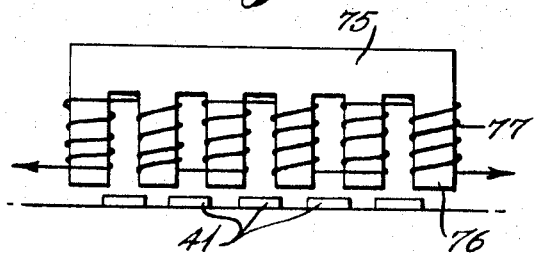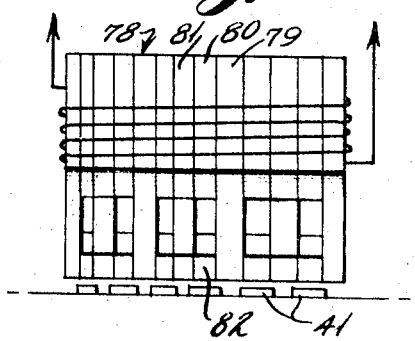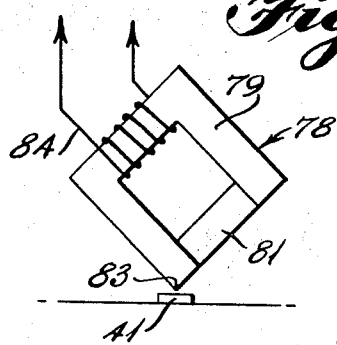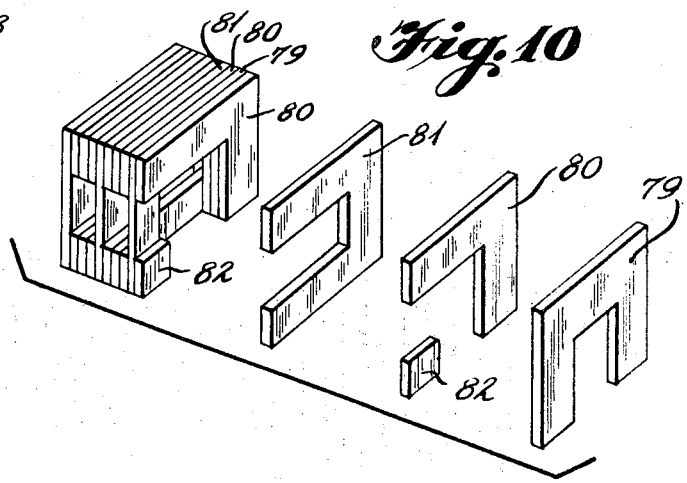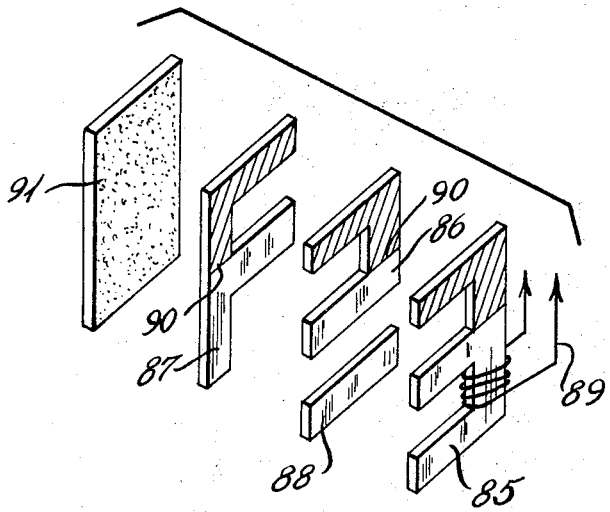
INVENTOR
CHARLES T. HENRICH

INVENTOR
CHARLES T. HENRICH

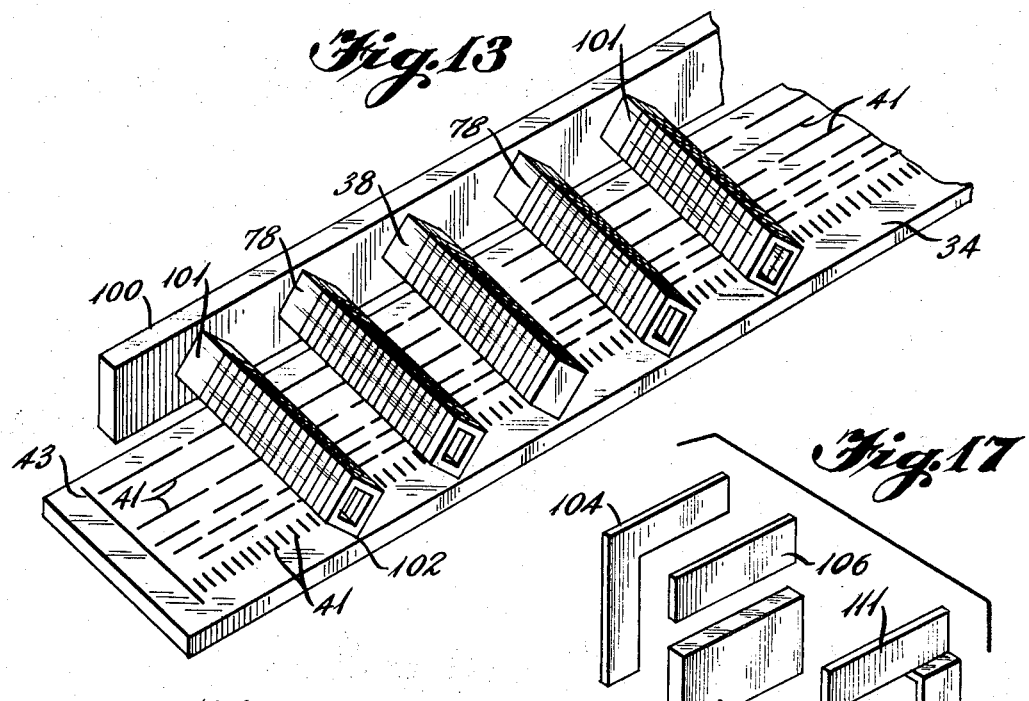
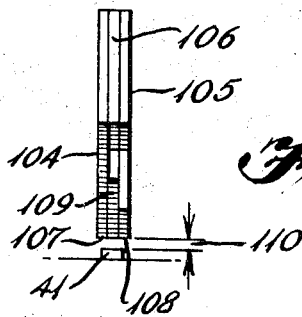
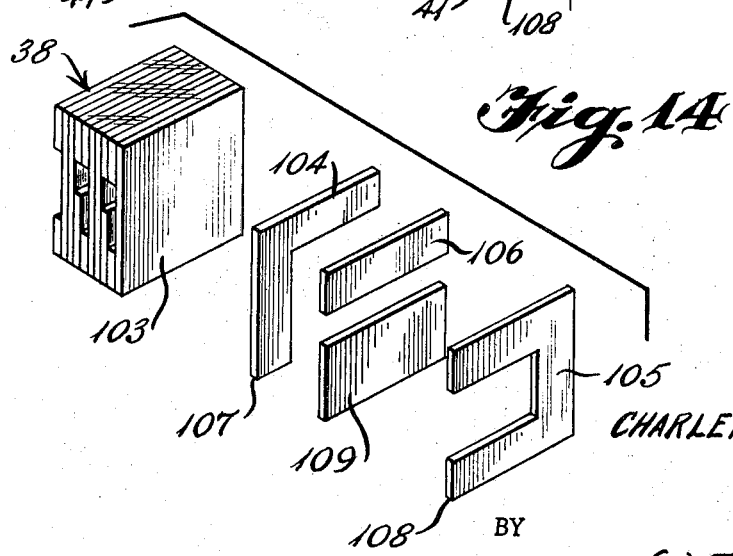

INVENTOR
CHARLES T. HENRICH

BY
ATTORNEYS

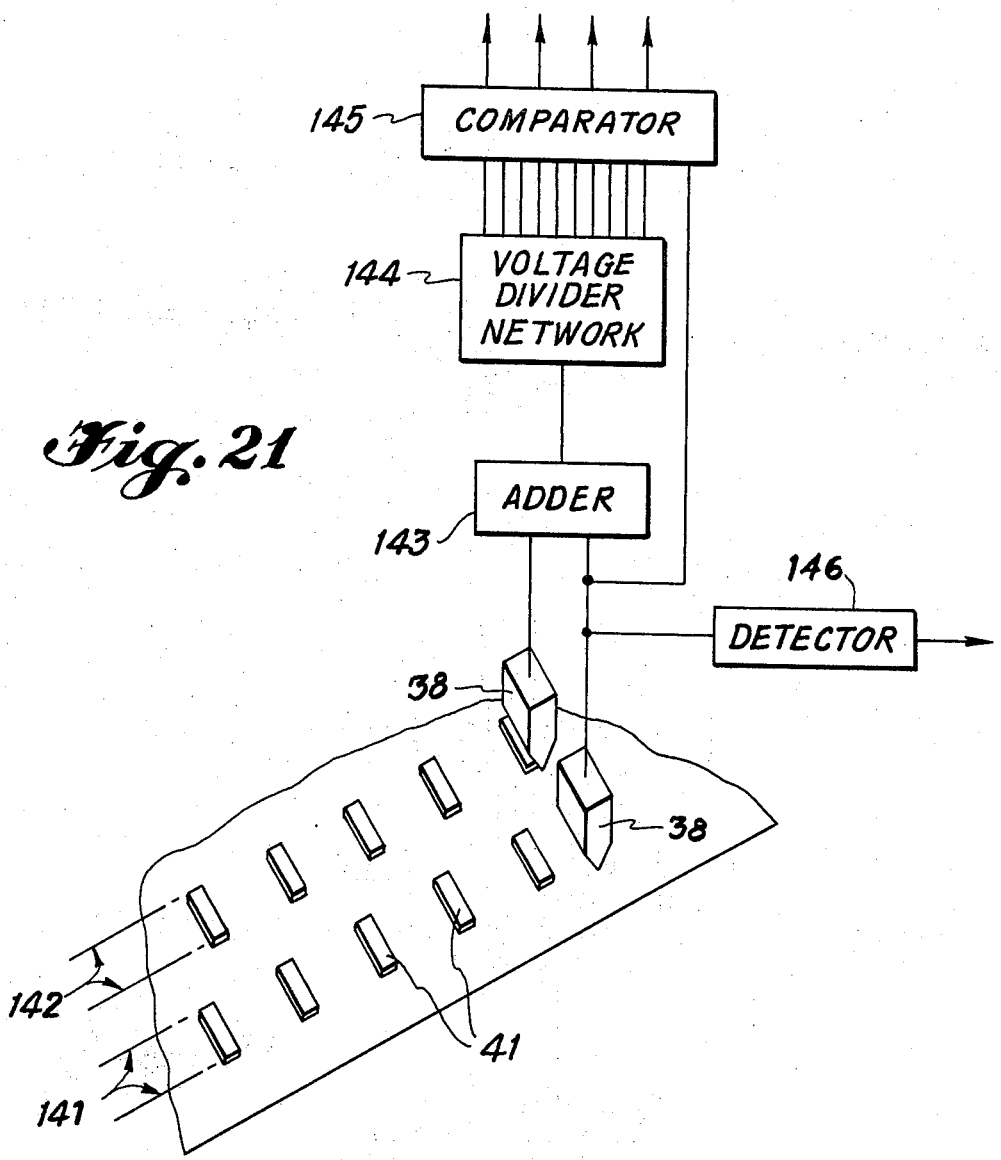

DIGITAL ENCODER AND POSITION REFERENCE

BACKGROUND OF THE INVENTION

1. Field of the Invention

This invention relates generally to measuring and the transmission of intelligence and relates particularly to apparatus for indicating the position of a movable member relative to a fixed member within very small tolerances.

2. Description of the Prior Art

The problem of position sensing is fundamental to the control of many types of devices, such as machine tools, plotters, automated assembly equipment and the like, and frequently design of the entire machine is affected by or made more complex by the problems resulting from the difficulty of accurately sensing and detecting the position of one element relative to another. Most of the common approaches to the problems are dependent on the counting of turns of a rotating member whose rotation is related in some fixed manner to the position of a movable member or the distance to be measured. In linear motion the problem of relating linear movement to shaft rotation in a constant manner is particularly severe. Lead screws with the smallest amount of error in pitch or lead angle are expensive and the errors are merely reduced, not eliminated.

In some cases rack and pinion sets are used to measure position; however, these sets are subject to errors in tooth form on both members, errors in spacing from tooth to tooth, errors due to mesh play, errors in radial play, concentricity errors on the pinion, center distance errors in the assembly, and the like. All of the above types of devices are subject to loss of accuracy due to wear.

The devices used to sense or indicate the position of a rotating member also have potential error sources since normally they tend to be large in size and constant accuracy over the full range of operation is not possible.

Many of the modern control systems process information in digital form. Devices which generate position information in the form of an analogue signal, such as a varying voltage or varying frequency, must be supplemented by analogue to digital and digital to analogue conversion apparatus which increases cost, complexity and error sources in the system. Examples of this type of structure are the U.S. Pats Nos. to Bower 2,947,929 and Farrand 3,340,451.

A number of systems or devices are presented as digital in nature because they operate on a principle based on counting some repetitive event such as recorded pulses, passage of recorded spots past a fixed readout, peaks of sinusoidal or square waves, etc. Examples of this type of structure are the U.S. Pats. Nos. to Rhoades 3,010,063, Marantette 3,059,236 and Uemura 3,308,449. Such systems have the disadvantage of not providing a fixed, absolute reference so that the loss of count creates an error and forces either a restart from the beginning or the addition of some redundant and costly memory device in the system.

Some efforts have been made to provide a magnetized element having magnetic areas of alternate polarity to produce a checkerboard pattern of magnetized areas on a record carrier. An example of this type of structure is the U.S. Pat. No. to Eppe 3,441,884. However, in this type of structure the magnetic flux flows entirely through the magnetized area, across a base member and back through an adjacent area.

Some systems operate on faith in that they have no built-in means for detecting errors. A significant hazard to such a system is momentary power loss or dropout and such momentary power losses occur in all practical power systems from time to time. Counting systems can be designed to be insensitive to power dropouts of a few milliseconds, but every such system has a limit to the size of power dropout which it can survive without incurring an error in the output data. Pulse counting systems are also sensitive to electrical noise involving momentary voltage peaks which may appear to the system as extra pulses.

SUMMARY OF THE INVENTION

The present invention is a digital encoder and position reference in which a scale having a coded pattern of intelligence containing indicia is applied to one element, and an indicia interpreting device is mounted on another element, with one of such elements being movable relative to the other. The scale includes bits of magnetizable material and the indicia interpreting device includes apparatus for recognizing the intelligence carried by the scale. Such apparatus may include a flux sensitive device such as a Hall generator, magneto resistor, or the like. A Hall generator is a solid state electronic device which has an output voltage proportional to the intensity and direction of the magnetic field in which it is located. The Hall generator is passive in the sense that a readout may be obtained while nothing in the system is changing and no physical contact is required between parts of the system. A magneto resistor is a resistive element which exhibits a change in resistance value in the presence of a magnetic flux field. This change may be used in conjunction with appropriate electronic circuitry to provide a means for sensing the presence and the value of a magnetic flux.

The present invention uses a fixed absolute reference to provide a specific and unique output for each position of one element relative to the other over the entire length of the scale so that the effects of power dropouts and noise peaks are minimized, and when such effects become severe enough to create a momentary lapse, the system will return to a correct readout value as soon as the disturbance has passed.

It is an object of the invention to provide a position sensing apparatus which is highly accurate, comparatively inexpensive, and which provides a direct unambiguous output that is different for each position of one member relative to the other over the entire length of the scale, thereby making the output entirely independent of the prior position or prior history of the positions and is not dependent on maintaining a count of some set of sequential events.

Another object of the invention is to provide a position sensing apparatus having an output in digital form which is directly compatible with existing data processing and display devices and which will not be degraded in accuracy of performance due to wear of mating parts, as well as being insensitive to disturbances from the surrounding environment.

BRIEF DESCRIPTION OF THE DRAWINGS

FIG. 4 is an enlarged fragmentary layout of a coded pattern.

FIG. 7 is a schematic diagram of a device for magnetizing an etched pattern.

FIG. 8 is a side elevation of a magnetizing apparatus.

FIG. 9 is a front view thereof.

FIG. 10 is an exploded perspective of the magnetizing device of FIGS. 8 and 9.

FIG. 11 is an exploded perspective illustrating the construction of the magnetizing device.

FIG. 13 is a diagrammatic representation of a modification of the device showing a read head as well as magnetizing and demagnetizing heads.

FIG. 14 is an exploded perspective of the read head.

FIG. 15 is an end elevation thereof.

FIG. 16 is a fragmentary side elevation thereof.

FIG. 17 is an exploded perspective of a modified form of read head similar to FIG. 14 but showing a single channel only.

FIG. 21 is a schematic diagram of apparatus for comparing similar adjacent channels.

DESCRIPTION OF THE PREFERRED EMBODIMENT

Figure 1:
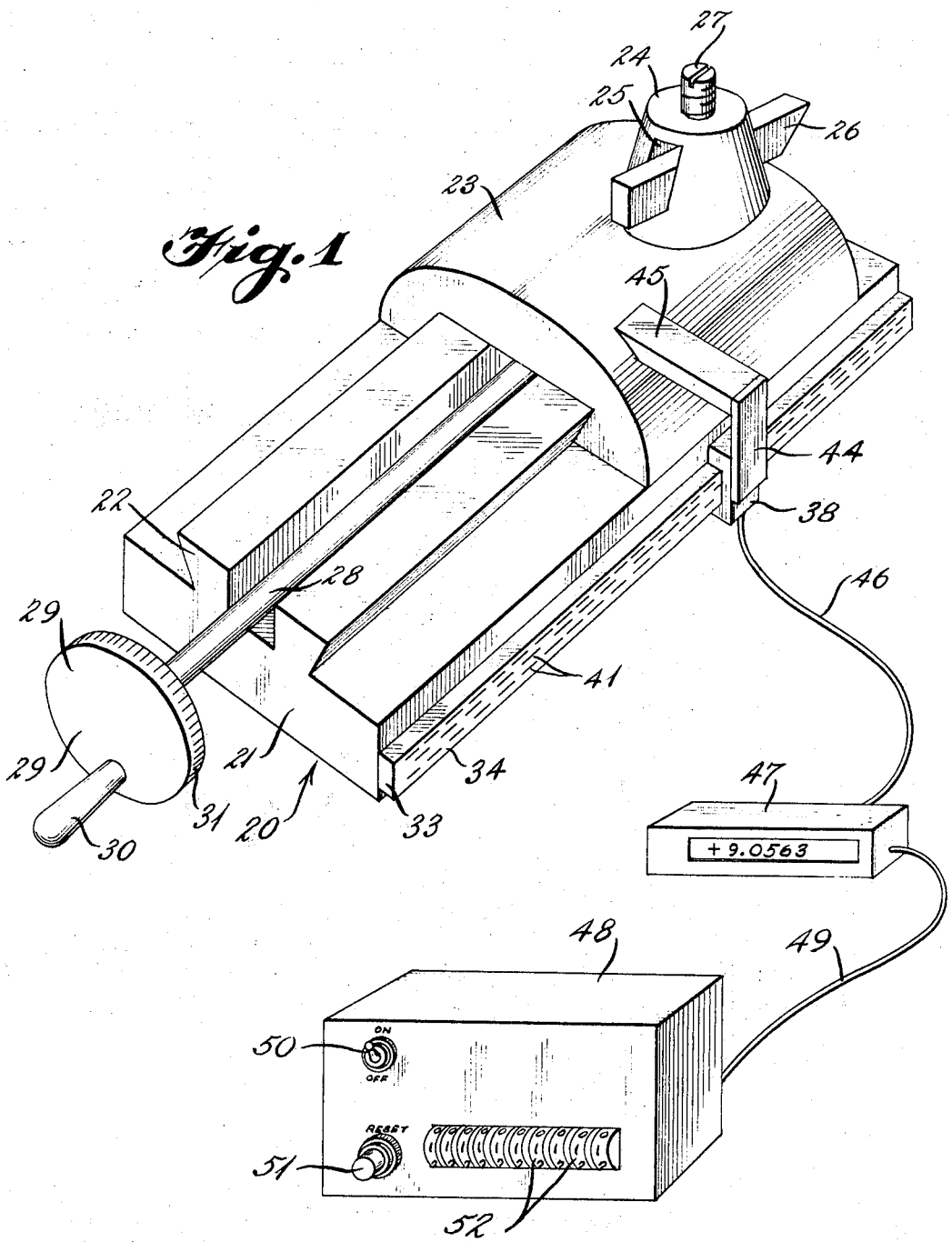
FIG. 1 is a perspective illustrating one application of the invention as applied to the crosshead slide of a machine tool.

With continued reference to the drawings, a machine tool or other mechanical device having relatively movable parts is provided in which it is necessary to know the position of one part relative to another. As illustrated in FIG. 1, a lathe cross slide 20 is provided having a fixed base 21 with a dovetail enlargement 22 on which a slide 23 is movably mounted. A tool post 24 mounted on the slide 23 is provided with an opening 25 in which a tool 26 is adapted to be fixed in adjusted position by a clamp or set screw 27. A lead screw 28, which is rotatably mounted on the base 21, engages the slide 23 so that rotation of the lead screw will cause the slide to move relative to the fixed base with the direction of moving being dependent upon the direction of rotation of the lead screw.

A crank wheel 29 is mounted on the end of the lead screw and is provided with an eccentrically mounted operating handle 30 for rotating the wheel 29 and the lead screw. Normally a dial 31 is provided around the periphery of the crank wheel and such dial includes markings at predetermined spaced intervals which are used to measure relative movement between the slide 23 and the fixed base 21. Usually the position of the tool relative to the axis of rotation of a workpiece is measured by counting the number of revolutions or portions of revolutions of the dial 31.

In many numerically controlled machine tools the crank wheel 29 and operating handle 30 are replaced by a stepper motor (not shown) which operates in response to electrical signals from a control device and causes the lead screw 28 to be rotated intermittently and advance or retract the slide 23 step by step. The structure thus far described is conventional and forms no part of the present invention.

In order to measure the movement of one part relative to another within very close tolerances, the present invention includes a support structure or base 33 on which a scale 34 is mounted. The support structure or base 33 is adapted to be mounted in fixed position on one of the fixed or movable parts in any desired manner, as by outwardly extending flanges 35 having mounting holes 36 for the reception of screws or other fasteners (not shown). As illustrated in FIG. 1, the support structure or base 33 is fixed along one side of the fixed base 21 of the lathe and parallel with the direction of movement of the slide 23.

Figure 2:
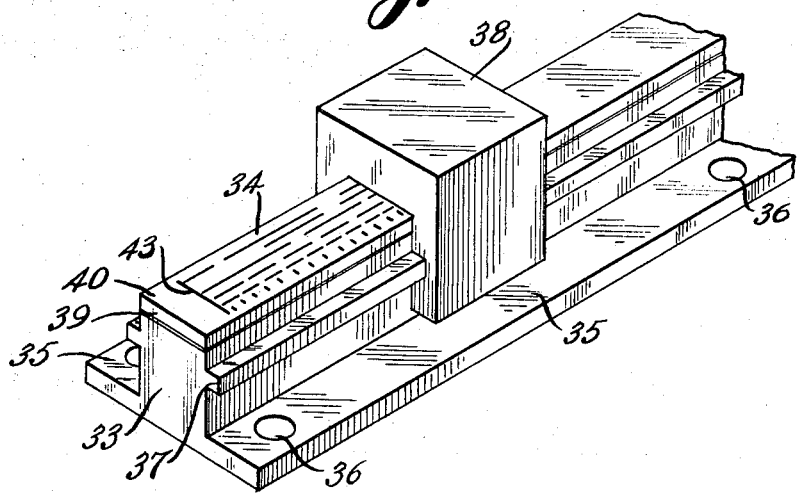
FIG. 2 is an enlarged fragmentary perspective of the device per se.

With reference to FIG. 2, the base 33 includes guide means such as a pair of outwardly extending guide rails 37 on which a pickup or read head 38 is slidably mounted. The scale 34 may include a substrate 39 of dimensionally stable material such as glass, metal, thermoplastic material, or the like which is fixed to the upper surface of the base 33 in any desired manner, as by the use of a permanent chemical bonding agent such as one of the epoxies or by the use of screws and locating pins or dowels as is conventional. The primary requirement of the bonding method used is that it must prevent any movement or shift of position of the substrate 39 relative to the base 33.

Figure 5:
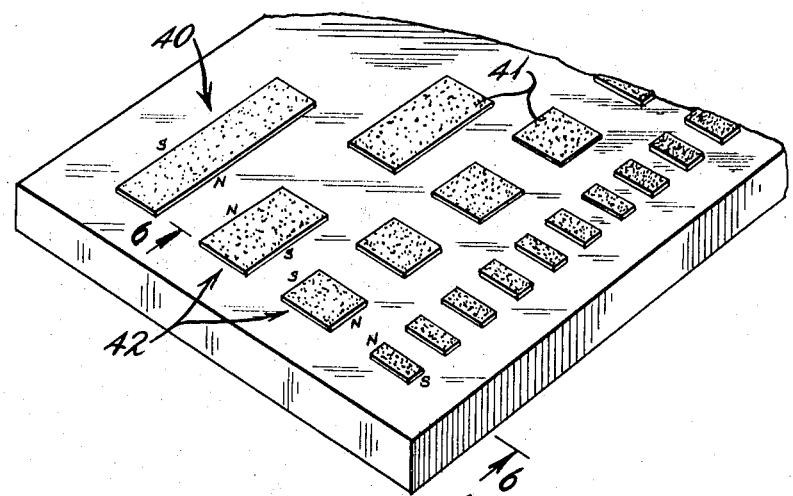
FIG. 5 is an enlarged fragmentary perspective of a pattern applied to one of the members.
Figure 6:
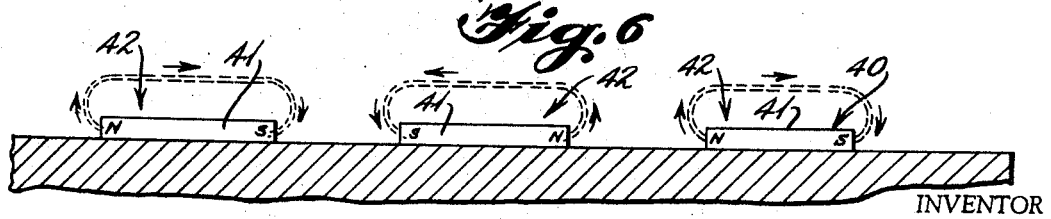
FIG. 6 is an enlarged section on the line 6—6 of FIG. 5.

On the top surface of the substrate 39 and permanently bonded thereto is a thin layer or film of a magnetizable material 40 which can be either a continuous film or a dispersion of fine particles of a material having high magnetic retentivity. In one embodiment certain portions of the magnetizable material 40 are removed in a manner which will be described later to provide a plurality of bits or pieces 41 arranged in a predetermined pattern of magnetizable spots or regions. As illustrated in FIGS. 4 and 5, the pattern consists of a plurality of rows or channels 42 arranged parallel to the direction of travel of the pickup head 38 with each channel having a multiplicity of magnetized bits of a specific size and spaced a predetermined distance apart.

Although the scale 34 has been illustrated and described as having a dimensionally stable substrate, it is contemplated that the magnetizable material could be mounted on any desired material including directly on the upper portion of the base 33. Also, it is noted that the magnetizable material of the bits 41 could be applied in a predetermined pattern without removing portions thereof.

The bits 41 of the pattern are arranged so that a line drawn at a predetermined angle across the pattern would produce a binary code word of "0"s and "1"s which is unique to the particular location of the line relative to a fixed starting point 43 at one end of the pattern. The binary code word is formed on the basis that each of the channels 42 represents one digit, and the presence of a magnetized region or bit 41 at the point where the line crosses a particular channel represents a binary "1" for the digit represented by that channel, and the absence of a magnetized region at the point where the line crosses a particular channel represents a binary "0" for the digit represented by that channel.

The pickup head 38 is connected by an attaching plate 44 to a post 45 which is welded or otherwise fixed to the slide 23 to form a rigid connection between the pickup head 38 and the slide 23, at least in the direction of movement parallel to the movement of the slide without any lost motion. Elastic compliance of the attaching plate 44 which permits slight movement of the pickup head 38 in a direction normal to the direction of travel of the slide is permissible and in some cases may be desirable as a means to allow for minor tolerance variations in the machine tool assembly along the length of the magnetic scale.

If desired, the guide rails 37 may be omitted from the base 33 if the attaching plate 44 is sufficiently rigid to maintain the pickup head 38 in close proximity to the scale 34 in which event it is possible to have a position-sensing device in which there is no contact between the two elements; however, high accuracy must be maintained. Such a device, by virtue of the isolation between the elements, is expected to have important applications in many scientific instruments where the measuring of relative motion is desirable without having the sensing device introduce additional forces or constraints on the system.

The output from the pickup head 38 is transmitted along a cable 46 to a digital readout box 47 having electronic circuitry which provides any necessary power supply conversion, provides binary to digital conversion circuits enabling a decimal readout to be provided in a numerical display by the use of "Nixie" tubes or the like, and provides any addition and subtraction circuits which may be required by the system. A control box 48 located in a position convenient to the operator of the lathe is connected to the digital readout box 47 by a cable 49. Preferably the control box is equipped with a power switch 50, a system reset button 51, and a plurality of system control switches 52 which provide the operator with means for selecting a numerical quantity which can be transmitted via cable 49 to the readout box 47.

Figure 3:
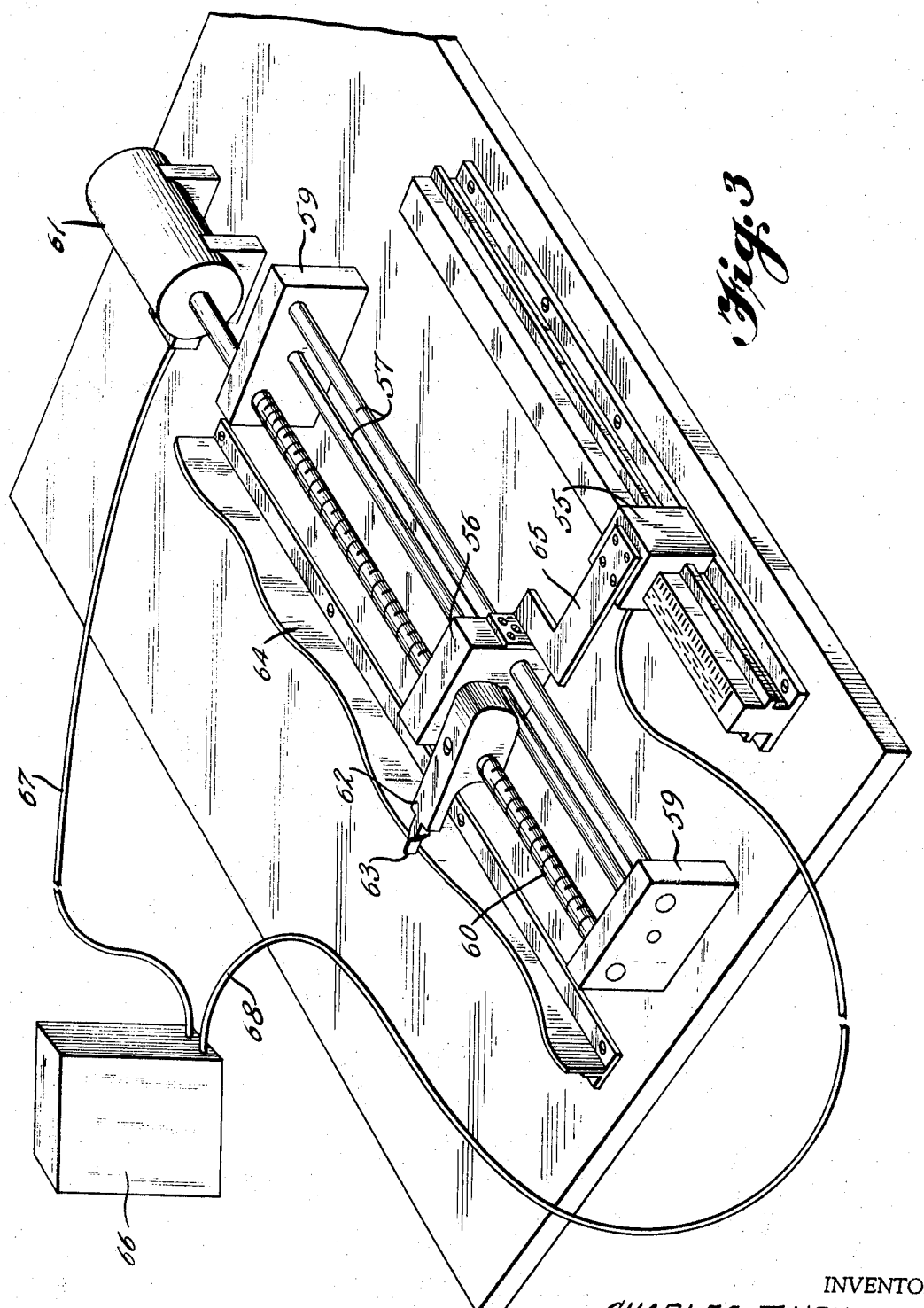
FIG. 3 is a perspective of an apparatus for accurately positioning a magnetic recording head for the purpose of recording a magnetized pattern on a magnetic scale.

In order to form a coded magnetic pattern having the precision and resolution required, such as that illustrated in FIG. 4, several methods can be provided. One method of creating the magnetic pattern is illustrated in FIG. 3, in which the support structure 33 is mounted on a fixed level surface with a substrate 39 and layer of magnetizable material 40 disposed on the upper surface of the support structure 33. Preferably the magnetizable material is of the kind used on magnetic tape of the type used in the data processing art. A recording head 55 is provided which is similar in mechanical configuration to the read head 38. The recording head includes a plurality of magnetic recording elements, one for each channel 41 of the scale 34 and such elements are maintained in close relationship to the magnetizable material 40.

In order to move the recording head 55 along the scale 34 and to generate the coded magnetic pattern on the magnetizable material, a travelling block 56 is movably supported on parallel rods 57 supported at opposite ends by mounting blocks 59. A highly accurate threaded member or lead screw 60 is rotatably supported by the mounting blocks 59 in spaced relation to the rods 57 and such lead screw passes through an opening in the travelling block 56. One end of the lead screw 60 is driven in any desired manner, as by a stepper motor 61. A travelling nut 62 threadedly engages the lead screw 60 with one surface in contact with the travelling block 56. The travelling nut 62 has a cam follower 63 which engages a linear cam 64. A rigid connecting link 65 is secured at one end to the travelling block 56 and connected at the opposite end to the recording head 55 so that any change in position of the travelling block 56 along the supporting rods 57 will result in an identical change of position of the recording head 55.

The stepper motor 61 rotates the lead screw 60 in direct response to a computing controller 66 connected to the motor by a cable 67. Also the computing controller 66 is connected to the recording head 55 by a cable 68. The computing controller is programed to generate a series of stepping commands to the stepper motor 61 and at the completion of each step of the stepper motor a series of recording commands are transmitted to the recording head 55 so that a distinct coded signal is recorded on the magnetizable material 40.

As an example, if the stepper motor makes 200 steps per revolution and if the lead screw 60 has a highly precise pitch of 0.010 inch per revolution, then one step on the stepper motor represents a change in position of the travelling nut 62 of 0.0005 or five ten thousandths of an inch.

If it were possible to construct a lead screw with a theoretically perfect helix angle throughout its entire length, and if it were possible to make a stepper motor in which each of the steps were absolutely identical to each of the other steps, then each step of the motor would result in a 0.0005 inch movement of the travelling block 56 and in turn would result in the movement of the recording head 55 of exactly 0.0005 inch. Since neither of the above possibilities can be fully realized in actual practice, a slight rotation of the travelling nut 62 about the lead screw 60 can be used as a means for causing the nut to travel to the correct position. By providing the linear cam 64, the cam follower 63 of the travelling nut will engage the cam surface and vary the angular position of the nut 62 at each point along the length of the lead screw 60 in such a manner that any error which exists in the helix angle of the lead screw 60 plus any errors in the position of the stepper motor 61 can be corrected by an appropriate rotation of the travelling nut 62 as a result of a change in height of the cam 64.

This method of correcting errors in the lead screw helix angle is known in the art and has been used on precision machines such as jig borers and the like. By using this apparatus, the linear scale good to 0.0005 inch resolution may be created by having the computing controller 66 count upward from zero adding 0.0005 to the count for each step of the stepper motor 61. Therefore when the device has moved the recording head 55 from one end of the scale to the other, such scale will have recorded on it a series of magnetic regions representing a linear magnetic scale of very high accuracy.

It is apparent that merely by reprograming the computing controller 66, the data recorded for each incremental position of the recording head could be made to represent some other function of the position of the recording head. For example, travel along the scale from the starting point 43 could represent an increase in the function "X" such that the value of "X" represents the distance from the starting point to a predetermined position of the recording head. The ordered value put out by the computing controller to be recorded on the magnetizable material could represent the value of "X" to the nearest 0.0005 inch, or it could represent the square of "X" or the logarithm of "X," or any other function desired.

It is noted that if desired a plurality of scales could be formed simultaneously by providing a plurality of support structures 33 which are parallel to each other, providing each of such support structures with a recording head 55 and extending the connecting link 65 so that all of the recording heads are connected to such line so that movement of the travelling nut 62 moves all of the recording heads 55 simultaneously. Of course, each of the recording heads 55 must be electrically connected to a computing controller 66 and may record the same information as the first recording head, or, if desired, could record different information on each scale.

A second method of forming a scale is provided in which portions of the magnetizable material are selectively removed from certain areas so that sharply defined accurately located regions or bits 41 of magnetic material can be created through the use of photo-etching processes based on the use of a photographically reduced precision master pattern. This embodiment has the advantage that the master pattern provides a means for very accurate reproduction at low cost. Also the photo-reduction process reduces any errors in the original from which it was reduced, thereby providing an improvement in accuracy.

With reference to FIGS. 4–7, it is clear that the binary coded pattern of magnetizable bits includes a plurality of areas having a variety of shapes ranging from a set of very small closely spaced narrow bits with a longitudinal axis in one direction to a long narrow rectangular bit with a longitudinal axis disposed in a direction normal to the axis of the small bits. This variation in the proportions of the magnetized regions presents problems in obtaining a reasonably constant level of magnetic field intensity for each of the channels of the scale.

The common method of recording digital data involves feeding a magnetizable medium such as a tape past a magnetizing head which has a gap in the magnetic circuit for each channel and with the gap being located generally transverse to the direction of movement of the tape. When the recording head is energized with a direct current or constant voltage signal, such tape has recorded thereon a long region in which the magnetizable material is all magnetized in the same direction. If such a head were moved over a binary coded pattern, successive regions or bits of magnetizable material would be magnetized with the primary magnetic axis parallel to the direction of movement of the magnetizing head and with the direction of magnetism being constant.

If the rectangular bits 41 of a binary coded pattern were magnetized as above described, the unidirectional character of the magnetization would result in a pattern in each data channel wherein each bit would have a north-seeking pole on one end and a south-seeking pole at the opposite end. Since the magnetizing direction would be constant, this would present unlike poles facing each other across the gap between successive bits of any one channel. Since opposite poles attract, there would be a tendency for flux lines emerging from the north-seeking poles to move across the gap to the south-seeking pole of the next adjacent bit instead of looping out to return into the south-seeking pole of the same bit. This phenomenon would tend to create problems in signal definition for the pickup head 38 in reading the pattern.

In order to enhance the definition or resolution of the complete system, it is desirable to have a situation in which the magnetization is such that the next adjacent pole is of like kind so that north-seeking poles will be adjacent to north-seeking poles and south-seeking poles will be adjacent to south-seeking poles. Also it may be desirable that the gap between adjacent bits be filled with material of low magnetic permeability in order to reduce the areas where contamination may collect.

By arranging for magnetization across the main axis of the scale with alternate channels magnetized in opposite directions, a pattern may be created wherein like poles are disposed adjacent to each other across the space between channels and the magnetic flux lines for the magnetized bits on either side of a gap between channels are in opposition to each other. Therefore, since like poles repel, the flux flowing from the north-seeking pole of each channel is deflected away from the magnetized bits of adjacent channels and has a much stronger tendency to return to the south-seeking pole of the same bit and be confined to the region directly above the magnetized bits of each channel.

In order to do this, a magnetizing head 75, illustrated schematically in FIG. 7, is provided having a plurality of downwardly depending teeth 76 with an electrical winding 77 arranged so that alternate teeth will have alternate magnetic polarity. As illustrated, the gaps between the teeth are centered over the central portion of the magnetizable bits 41 and the teeth 76 are adapted to bridge the gap between adjacent channels and overlie a portion of the adjacent bits.

With reference to FIGS. 8–10, a magnetizing head 78 is provided which is different from the magnetizing head illustrated in FIG. 7. In this structure the magnetizing head includes a stack of laminations 79, 80 and 81 fabricated from magnetic steel of high permeability and separators 82 fabricated from a material of low magnetic permeability. As illustrated, the magnetizing head 78 is arranged so that one corner indicated at 83 is located adjacent to the bits of magnetizable material and the laminations are arranged so that lamination 79 will represent one pole and the lamination 81 will represent the opposite pole with a shielding separator 82 disposed between the laminations 79 and 81 in the area of the corner 83.

The magnetizing head 78 is supplied with electrical energy by an armature or winding 84 so that if a constant voltage is applied to such winding a magnetic flux will be generated in the laminations. Laminations 79, 80 and 81 constitute one magnetic path which is interrupted at the gap in the lower portion thereof. If a bit 41 of magnetizable material is placed in close proximity to the corner 83, then the magnetizable material provides a high permeability path for the fringe flux between the laminations 79 and 81 in the vicinity of the corner 83. Therefore, the magnetizable material will become magnetized in the manner indicated in FIG. 5.

In order to protect the laminations and windings, the magnetizing head 78 preferably is impregnated and encapsulated in some suitable diamagnetic material, after which the corner 83 is ground to produce a sharply defined straight edge. This limits the fringe field, which performs the magnetizing function, to a narrowly defined region centered about the corner 83 and the direction of such fringe field is parallel to the sharp edge of the corner 83. This structure is used for simultaneously magnetizing all channels of a binary coded pattern. However, a separate magnetizing head could be supplied for each channel.

As illustrated in FIG. 11, a magnetizing head for a single channel is provided including laminations 85, 86 and 87 which are similar to the laminations 79–81 respectively. A separator 88 is provided similar to the separator 82. A winding 89 is provided around portions of one of the laminations 85 or 87 and the direction of polarity depends upon the direction of the current flow. It is intended that the upper portions of the laminations 85–87 located above the line 90 are to be used during assembly and manufacture as a means for holding, clamping and insuring proper alignment and that such areas are removed as one of the final steps of manufacture leaving a configuration essentially square in shape. If desired, a separator 91 can be provided for separating the magnetizing heads of adjacent channels.

In a coded pattern similar to that shown in FIG. 4, the least significant bit of magnetic material is represented by a series of equally spaced magnetized regions alternating with non-magnetized regions. An advantage of digital systems of the type described above is that the intensity of the signal obtained is unimportant as long as it is large enough to be recognized as a valid signal. However, it is apparent that as the resolution of the scale is increased, the magnetized bits become smaller and smaller and eventually some practical limit is reached. In order to detect changes of position of one element relative to another to a resolution finer than that represented by the closest spacing of the magnetized bits on the scale, a vernier device illustrated diagrammatically in FIGS. 12a–12f and FIG. 21 is provided.

Figure 12F:
FIGS. 12a–12f are schematic diagrams illustrating the outputs of two channels and the effect of their combined usage.
Figure 12E:
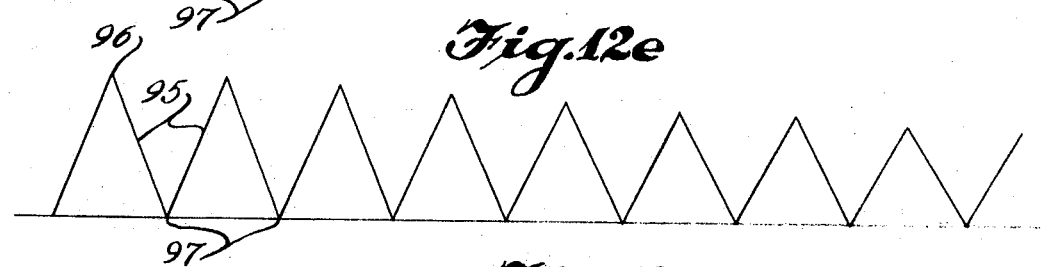
Figure 12D:
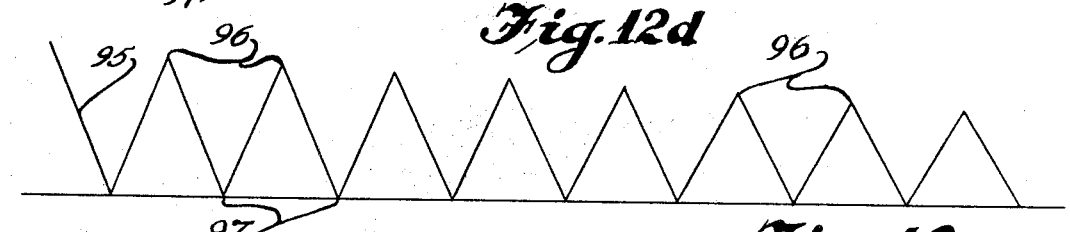
Figure 12C:
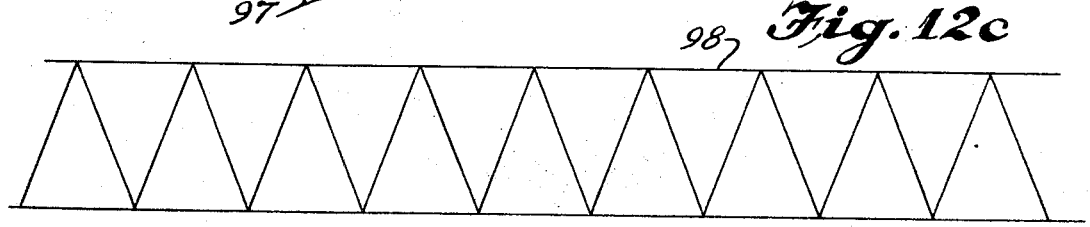
Figure 12B:
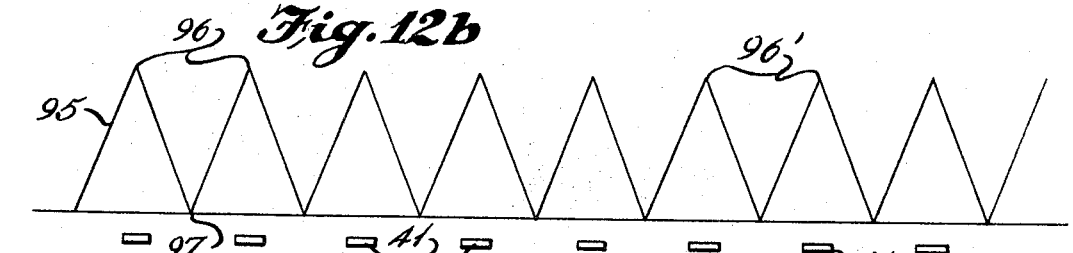
Figure 12A:
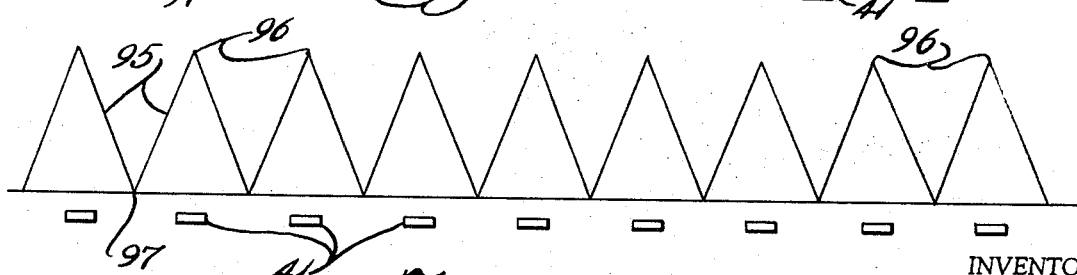

As an example, FIG. 12a represents a longitudinal edge view of the least significant channel 141 of magnetized bits 41 of the scale 34 where the material has been removed from the area between adjacent bits to leave equally spaced regions of material. If these regions of magnetizable material are properly shaped and spaced, it is possible to generate a flux field in the region just above the pattern which varies in a substantially symetrical manner between alternating maximum and minimum output values, as indicated by the curve 95 in FIG. 12a. The maximum output value 96 of such curve is located at the midpoint of the region of magnetic material and the minimum output value 97 of the curve is located in the midpoint of the blank areas between the bits of magnetic material.

The electrical circuity associated with the pickup or read head 38 is designed to indicate the presence of a binary "1" when the output value exceeds a value midway between the maximum and minimum values 96 and 97, and to register a binary "0" when the output value is less than the midway value.

Adjacent to the primary least significant channel 141, a secondary channel 142 of magnetizable material is provided which is substantially identical with the primary channel and is offset therefrom by one-half of the spacing between the bits of magnetizable material as indicated by FIGS. 12b and 21 so that the maximum point 96 of the secondary channel is opposite the minimum point 97 of the primary channel.

A pair of pickup or read heads 38 are provided, one for each of the primary and secondary channels 141 and 142, and such pickup heads are mounted in line with each other so that when the output from the pickup head of the primary channel 141 is at a maximum value, the output for the pickup head of the secondary channel 142 will be at a minimum value. When the pair of pickup heads are moved relative to the coded pattern, a decrease in the output from one head is matched by an increase in the output from the other head. Thus, the sum of the outputs from the two heads represents a substantially constant value equal to the sum of the maximum output 96 from one head and the minimum output 97 from the other head as indicated by the curve 98 in FIG. 12c. If the output obtained from the primary and secondary pickup heads is larger at one point on the scale than at another, as indicated in FIGS. 12d and 12e, than the sum of the outputs will show a corresponding change, as illustrated by the curve 99 in FIG. 12f.

However, for any particular position of the head assembly along the scale, the ratio of the sum of the outputs to one of the individual head outputs will have a specific value unique to that head assembly position. Further, as the head assembly moves from one bit to the next, the ratio will vary in a predictable manner which is determined by the geometry of the system. Since the scale patterns are repeating and symetrical, the ratio patterns from bit to bit are the same anywhere on the scale.

With particular reference to FIG. 21, if the space between the maximum output values of two bits is divided into a selected number of equal spaces, as for instance 10, and if the above described ratio is determined for each division point, then a set of ratio values is obtained which defines each of 10 equally spaced positions between the maximum output value of one bit and the maximum output value of the next. Thus, a voltage divider network 144 may be designed having 10 different outputs each of which bears a ratio to the input which is one of the ratios in the above defined set. After the primary and secondary head outputs have been connected to an adder 143 in summing relationship, the combined voltage is fed to such voltage divider network 144 and the outputs provide 10 references which are used by a comparator 145 as a basis for comparison with the actual output from the primary pickup head to detect positions of the pickup head assembly to a resolution 10 times as great as that available from the basic pattern shown in FIG. 12a.

In order to do this, the output from the primary pickup head first is fed to a detector circuit 146 which detects a binary "0" or a binary "1" for that channel. Secondly the output from the primary pickup head is combined in the adder 143 with the output from the secondary pickup head to provide the sum voltage input to the voltage divider network 144. Thirdly the output from the primary pickup head is compared in the comparator 145 with the outputs of each of the ten divider networks in turn in order to detect the position of the primary pickup head to a resolution representing a spacing ten times as fine as the spacing in the primary channel. Thus, as an example, if the space in the primary channel produces a binary "0" or binary "1" for each 0.0005 inch of movement of the primary head, then the output from the voltage divider networks provides a resolution to 0.00005 inch.

It will be apparent that if the ratio patterns are repeatable to sufficient accuracy, the method may be extended to define any desired number of points between bits and a corresponding increase in resolution may be achieved.

It is noted that if the absolute value of the maximum output varies, as illustrated in FIGS. 12d, e and f, the accuracy of the readout is not affected because the system is dependent on ratios between the magnitude of the sum and the magnitude of one component and is independent of the absolute values.

One of the above ratios will be associated with the location midway between the maximum output values between adjacent bits in the least significant bit channel. The voltage divider output associated with this midpoint ratio provides a reference value that may be used as a basis for choosing the specific head position at which the other channels of the encoder are considered to have changed state. Thus an output in any channel which is found to be higher than such midpoint output is considered a logic one and all outputs less than such midpoint output are considered logic zero. In this way adverse effects due to small variations in the outputs of all channels are minimized since a change in overall signal level will cause a corresponding change in the amplitudes of the voltage divider network midpoint output.

With reference to FIG. 13, an apparatus is provided which may be used to magnetize, read, and then demagnetize the coded pattern as the pickup or read head passes a specific portion of the scale. In this modification, a scale 34 having a pattern of magnetizable bits is mounted on one element of a machine tool and a frame member 100 is secured to a second element of such tool. A flux sensitive multi-channel pickup or read head 38 is mounted on the frame member 100 at a fixed angle to the direction of movement and with such angle being consistent with the design of the pattern. A pair of magnetizing heads 78 are mounted on the frame member 100, on each side of and generally parallel to the pickup head 38. The corner 83 of each of the magnetizing heads is located in close proximity to the scale 34.

Spaced outwardly from and generally parallel with each of the magnetizing heads 78 is a demagnetizing head 101 of a constructure similar to the magnetizing heads 78 and having a corner 102 located adjacent to the scale 34. The magnetizing heads 78 and the demagnetizing heads 101 are structurally identical and are similar to the heads illustrated in FIGS. 8–10, however, the windings of the magnetizing heads 78 are energized by a direct current to magnetize the bits 41 of the pattern, while the windings of the demagnetizing heads 101 are energized by an alternating current so that the bits of magnetizable material will be demagnetized. If desired the frame member 100 and the pickup head, magnetizing heads and demagnetizing heads may be covered by a magnetically shielded housing (not shown).

As the frame member 100 is moved relative to the scale 34, the magnetizable bits 41 first are demagnetized by one of the demagnetizing heads 101 after which the adjacent magnetizing head 78 will create a set of constant flux fields which will magnetize the bits 41 so that they may be read by the pickup head 38. After the signals have been read, the trailing demagnetizing head 101 will demagnetize the bits of magnetizable material. In this manner the bits of magnetizable material in the etched scale which are exposed to possible fallout from magnetizable particles such as iron filings, machining chips and the like are always in a demagnetized state so that they do not attract foreign objects. Additionally the etched pattern is always magnetized to full strength just prior to being read by the pickup head 38 thereby assuring maximum output on all information channels.

Since scales of the type to be used with this system will require a relatively large number of parallel channels or tracks of recorded or etched data, the pickup or read head to be used with the system should be a multi-track assembly in which all of the flux sensing gaps are arranged in a single straight line with the gaps having essentially zero length as measured in the direction parallel to the main axis of the data channels. In the magnetizing heads disclosed in FIGS. 8–11, these conditions are met through the use of laminated structures which are very thin and in which alignment of the gaps of all of the channels is achieved as the result of the grinding or machining operation performed on the completed assembly leaving a single common straight edge as a locus of the gaps.

As illustrated in FIGS. 14–16, a pickup or read head 38 is provided having a plurality of channels located in side-by-side relation with a separating shield 103 disposed between channels. Each channel includes pole pieces 104 and 105 arranged on opposite sides of a sensing element 106 such as a Hall generator, magneto resistor, magnistor or the like. The pole piece 104 is of generally L-shaped configuration with the upper leg located adjacent to and in intimate contact with the sensing element 106 and the lower leg terminating in a corner 107 disposed adjacent to the magnetized bits 41. The pole piece 105 is of generally C-shaped configuration with the upper leg located adjacent to and in intimate contact with the sensing element 106 and the lower leg terminating in a corner 108 substantially in alignment with the corner 107. The intermediate leg of the pole piece 105 is generally parallel with but spaced from the lower leg of the pole piece 104 to minimize losses in the magnetic circuit.

The pole pieces 104 and 105 are made of highly permeable material which act as flux concentrators to collect the magnetic flux emanating from the magnetized bits 41 and conduct the flux to the sensing element 106. A shielding spacer 109 of low permeability, highly conductive material such as copper, silver, or the like is provided to substantially fill the space between the pole pieces 104 and 105 which is unoccupied by the sensing device 106. To achieve maximum output from the sensing element 106 for a given intensity of magnetic flux, the gap 110 between the corners 107 and 108 of the pole pieces and the magnetized bits 41 on the scale 34 should be maintained as small as possible.

With particular reference to FIG. 17, a modified form of pickup head for a single channel is illustrated in which the pole piece 105 is replaced by a pole piece 111 having an intermediate offset portion 112. A spacer 113, which is substantially wider than the spacer 109, is placed between the pole piece 104 and the offset portion 112 of the pole piece 111 to decrease the losses therebetween and enhance the flux concentration performance of the pole pieces. If desired, a plotting compound (not shown) can be injected into the voids of the assembly to maintain the parts in fixed position relative to each other.

Thus far the structure provided has been for use with a scale having a pattern in which the bits of magnetizable material have been substantially the same width as the individual channels of the pickup head 38. It is clear that the width of the scale 34 and the space required for the pickup head, recording head, and magnetizing head is limited by the minimum practical spacing of the detailed parts within the various head assemblies. As indicated before, the direction of magnetization of the magnetizable material should be across the main axis of the scale 34.

Figure 18:
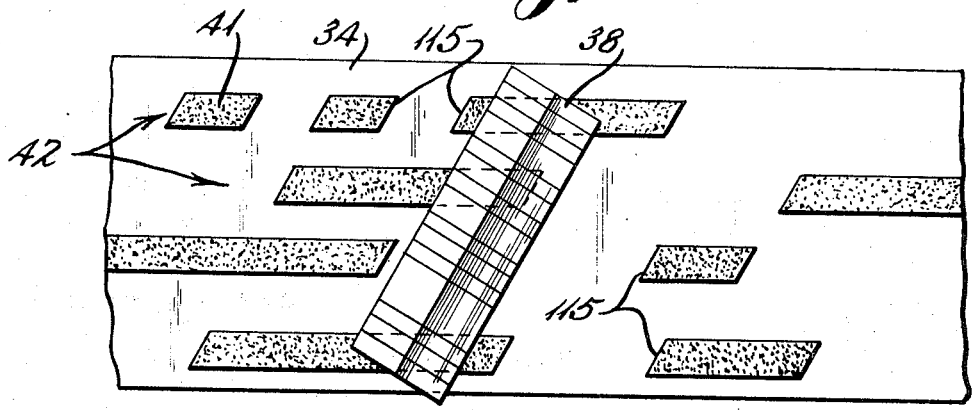
FIG. 18 is a schematic top plan view of a modified form of read head and coded pattern.

As illustrated in FIG. 18, the direction of magnetization could be in some angle other than 90°, such as 30°, 45° or 60° to the major axis of the scale. When this is done, the magnetizable bits 41 of each channel have end faces 115 disposed at an appropriate angle to the major axis of the scale. The pickup or read head 38 is located at a corresponding angle and therefore the straight edge of such head adjacent to the channels 42 becomes foreshortened in the direction of movement and the channels 42 need not be as wide as the pickup head assembly. Since the width of the individual channels is reduced, the width of the scale 34 can be reduced in direct proportion to the sum of the width of the individual channels and the distance between adjacent channels.

As an example, when the pickup head 38 is oriented substantially 60° to the axis of the magnetic scale, the scale width could be as small as one-half the width of the pickup head. By utilizing this principle, a substantial number of channels could be located within a relatively small spaced, while the overall length of the pickup head could be substantially wider than the width of the scale.

Figure 19:
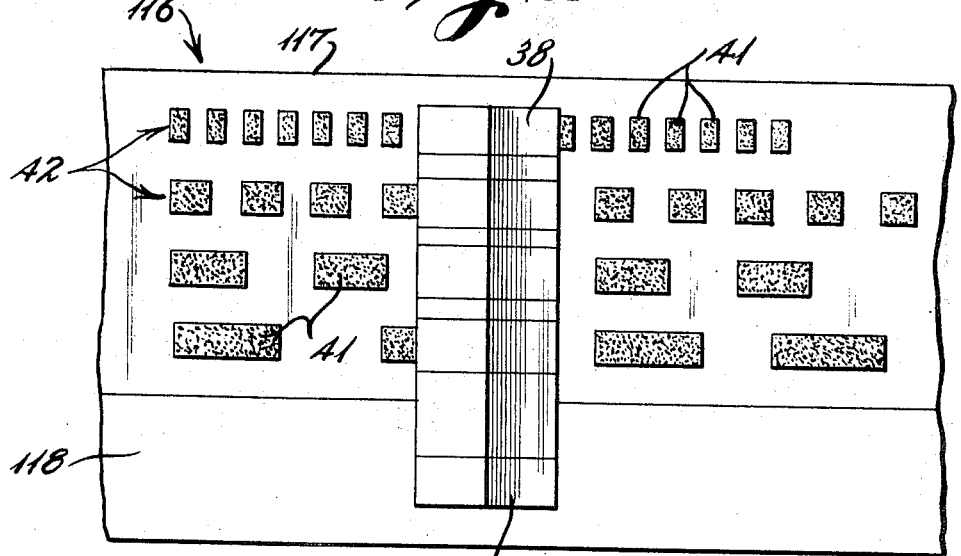
FIG. 19 is a schematic top plan view of a further modified form including a read-write head and a scale having coded pattern and an uncoded area.
Figure 20:
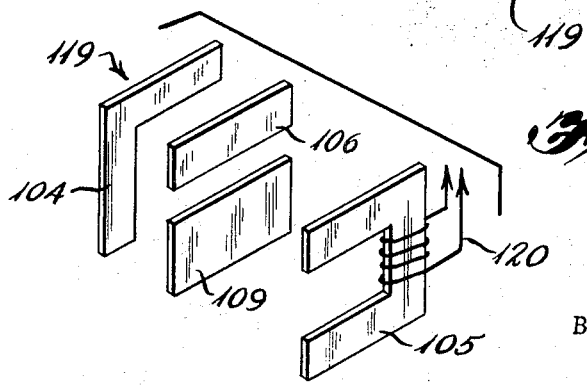
FIG. 20 is an exploded perspective of a read-write head.

With reference to FIGS. 19 and 20, a modified form of scale 116 is provided in which a first portion 117 is provided with a plurality of channels of magnetizable material as previously described. A second portion 118 of magnetizable material having no predetermined bits is located adjacent to and generally parallel with the first portion. The pickup or read head 38 is mounted for cooperation with the first portion 117, and a combination read-write head 119 is located in proximity to the second portion 118. The read-write head 119 is similar in construction to the read head 38 and includes pole pieces 104 and 105 disposed on opposite sides of a sensing element 106. A shielding spacer 109 substantially fills the space between the pole pieces 104 and 105 which is unoccupied by the sensing element. In this modification a selectively operable coil or winding 120 is disposed about a portion of one of the pole pieces and such winding is selectively supplied with a constant voltage to cause a magnetic flux to flow from one pole pieces across the magnetizable material 118 to the other pole piece to magnetize the portion of material between the pole pieces and thereby record a mark on the second portion 118. On the second pass along the scale, the coil 120 will not be energized and the pole pieces 104 and 105 will transmit magnetic flux to the sensing element 106 to indicate the presence of a magnetized area. This embodiment provides the accuracy and permanence of the predetermined pattern plus a provision for recording selected reference marks adjacent to such pattern.

In the operation of the device, a scale 34 having a binary coded pattern is mounted in fixed position on one element of a pair of relatively movable elements. A pickup or read head 38 is mounted on the other of such elements and located closely adjacent to the scale 34. The output from the pickup head 38 is transmitted to a digital readout box 45 which provides a decimal indication of the relative position of the two machine elements. The indicia or coded information on the scale 34 is a series of unique absolute numberical data which will provide a distinct numerical value for each separate position of one machine element relative to the other and regardless of whether the machine elements are stationary or are moving relative to each other. Even if power to the encoder is temporarily interrupted while the machine element continues to function, as soon as power is re-established to the encoder, the readout box 45 reflects the true relative positions of the machine elements. A control box 48, having a plurality of system control switches 52 which can be set to provide an offset reference and a reset button 51, causes the numerical values set on the switches 52 to be introduced into the computations taking place within the digital readout box 47 so that the operator can observe the relative positions and can order the movable element to move a predetermined distance from a known first position to a desired second position relative to the fixed element.

I claim:

1. In a digital encoder and position reference apparatus for indicating the position of a movable element relative to a fixed element and including a pickup head having a plurality of magnetic flux sensing means, a digital readout box operatively connected to said pickup head and adapted to convert a binary coded signal from said sensing means to a decimal equivalent: the improvement comprising a scale located adjacent to said sensing means, said scale including an elongated base, a plurality of generally parallel channels extending along the major axis of said base, one of said channels being in proximity to each of the sensing means of the pickup head, each of said channels having multiple magnetized and non-magnetized areas, said magnetized areas adapted to emit concentrated magnetic flux lines in predetermined directions, the magnetized areas of said channels being arranged to indicate a different binary coded word for each position along the entire length of said scale, and the magnetized areas of adjacent channels having opposed polarity so that the north-seeking pole of one channel will be adjacent to the north-seeking pole of an adjacent channel, and the south-seeking pole of said one channel will be adjacent to the south-seeking pole of another adjacent channel, whereby the magnetic flux field of each magnetized area will be located adjacent to that area only.

2. A digital encoder and position reference for indicating the position of a movable element relative to a fixed element comprising a scale having a binary coded pattern fixed to one of said elements, said pattern including a plurality of spaced elongated generally parallel channels, each of said channels including alternate magnetized and non-magnetized areas, each of said magnetized areas having a first magnetic pole along one lateral edge and a second magnetic pole along the opposite lateral edge, said edges being parallel to the length of the channel, adjacent channels being magnetized in opposite directions so that the magnetic poles on opposing sides of any inter-channel gap are of the same magnetic polarity, each magnetized area emitting concentrated magnetic flux lines in predetermined directions, said magnetized and non-magnetized areas in said channels indicating a different binary coded word for each position along the entire length of said scale, a pickup head mounted on the other of said elements and disposed in close proximity to said scale, said pickup head including a flux sensitive sensing element for each channel of said scale, means for conducting magnetic flux from opposite sides of each channel to the corresponding sensing element, and means operatively connected to said pickup head for utilizing the coded signal, whereby the position of said movable element relative to said fixed element is determined.

3. The structure of claim 2 in which said scale is a photo-etched pattern in which each channel includes alternate bits of magnetizable and non-magnetizable materials.

4. The structure of claim 3 including means on both sides of said pickup head for magnetizing and demagnetizing said magnetizable material.

5. The structure of claim 2 in which said scale includes a layer of magnetizable material and in which each of said channels includes alternate magnetized and non-magnetized areas.

6. The structure of claim 2 in which said sensing element includes a magnetoresistor.

7. The structure of claim 2 in which said pickup head is disposed generally normal to the major axis of said scale.

8. The structure of claim 2 in which said pickup head is disposed at an angle less than 90° to the major axis of said scale and each of said magnetized areas terminates in an edge parallel to said pickup head.

9. The structure of claim 2 in which said scale includes an uncoded strip adjacent to said coded pattern, and said pickup head includes a combination read-write portion disposed in proximity to said uncoded strip so that additional indicia can be selectively applied to said scale.

10. The structure of claim 2 in which said scale includes at least two channels of indicia in which the pattern of indicia in one channel is offset from the pattern in the other channel, means for combining the information sensed from said two channels to create a basic reference signal, means for electronically comparing fractional portions of said basic signal with the signal from one of said channels, whereby the location of said sensing element relative to said scale is determined to a resolution greater than that represented by the closest spacing of the magnetized areas in any channel of said scale.

11. The structure of claim 2 in which said means for conducting magnetic flux to each of said sensing elements includes a pair of spaced pole pieces, each of said pole pieces having a first portion engaging said sensing element and a second portion located adjacent to the associated channel, and said second portion of each of the pole pieces of the pickup head being disposed along a single common straight edge.

12. The structure of claim 11 in which at least one of said pole pieces is offset relative to the other.

* * * * *